United States Patent
Fujiwara et al.

(10) Patent No.: US 10,339,697 B2
(45) Date of Patent: Jul. 2, 2019

(54) MEDICAL IMAGE PROCESSING APPARATUS

(71) Applicant: TOSHIBA MEDICAL SYSTEMS CORPORATION, Otawara-Shi (JP)

(72) Inventors: Megumu Fujiwara, Sakura (JP); Tatsuya Kimoto, Otawara (JP); Yasuko Fujisawa, Nasushiobara (JP)

(73) Assignee: Toshiba Medical Systems Corporation, Otawara-shi (JP)

( * ) Notice: Subject to any disclaimer, the term of this patent is extended or adjusted under 35 U.S.C. 154(b) by 122 days.

(21) Appl. No.: 14/949,039

(22) Filed: Nov. 23, 2015

(65) Prior Publication Data

US 2016/0155220 A1 Jun. 2, 2016

(30) Foreign Application Priority Data

Nov. 27, 2014 (JP) ................................ 2014-239962

(51) Int. Cl.
*G06K 9/00* (2006.01)
*G06T 15/08* (2011.01)
*G06T 7/70* (2017.01)

(52) U.S. Cl.
CPC .............. *G06T 15/08* (2013.01); *G06T 7/70* (2017.01); *G06T 2207/10072* (2013.01); (Continued)

(58) Field of Classification Search
None
See application file for complete search history.

(56) References Cited

U.S. PATENT DOCUMENTS 6,285,780 B1 * 9/2001 Yamakita ............. A01K 11/006
382/110
2003/0023156 A1 1/2003 Pappas et al.
(Continued)

FOREIGN PATENT DOCUMENTS

CN 101014981 A 8/2007
CN 103284737 A 9/2013
(Continued)

OTHER PUBLICATIONS

Chinese Office Action dated Feb. 27, 2018 in corr. Chinese Patent Application No. 201510835725.7, filed Nov. 26, 2015 (w/ English translation of Categories of Cited Documents only) 8 pp.
(Continued)

*Primary Examiner* — Sean M Conner
(74) *Attorney, Agent, or Firm* — Oblon, McClelland, Maier & Neustadt, L.L.P.

(57) ABSTRACT

According to one embodiment, a medical image processing apparatus is configured to capture images of an observation object over time to obtain a three-dimensional image. The observation object includes a first hard tissue and a second hard tissue which are adjacent to each other. The medical image processing apparatus includes a control circuit, a plane acquisition unit, and an image generator. Under the control of the control circuit, the plane acquisition unit extracts the first hard tissue and the second hard tissue based on the three-dimensional image. The image generator generates, as an image for observation, a cross-sectional image of a plane including the first hard tissue and at least part of the second hard tissue or an image projected on a plane parallel to the plane including the first hard tissue and at least part of the second hard tissue based on the three-dimensional image.

10 Claims, 11 Drawing Sheets

(52) U.S. Cl.
CPC ............... *G06T 2207/30008* (2013.01); *G06T 2207/30172* (2013.01); *G06T 2215/06* (2013.01)

(56) References Cited

U.S. PATENT DOCUMENTS

| | | | |
|---|---|---|---|
| 2013/0223703 A1 | 8/2013 | Fujisawa et al. | |
| 2014/0078139 A1* | 3/2014 | Park | G06T 7/0012 345/420 |
| 2014/0328524 A1* | 11/2014 | Hu | G06T 7/174 382/128 |

FOREIGN PATENT DOCUMENTS

| | | |
|---|---|---|
| JP | 2006-102353 A | 4/2006 |
| JP | 2013-172815 | 9/2013 |

OTHER PUBLICATIONS

Japanese Office Action dated Jul. 3, 2018 and issued in corresponding Japanese Patent Application No. 2014-239962, (4 pages).

* cited by examiner

MEDICAL IMAGE PROCESSING APPARATUS

CROSS-REFERENCE TO RELATED APPLICATION

This application is based on and claims the benefit of priority from Japanese Patent Application No. 2014-239962, filed on Nov. 27, 2014; the entire contents of which are incorporated herein by reference.

FIELD

Embodiments described herein relate generally to a medical image processing apparatus.

BACKGROUND

In the field of orthopedics for treating diseases and injuries of the bone, joint, muscle, nerve, and the like, plain radiography is often used to observe the joint or the like with a still image.

Besides, X-ray fluoroscopy is also used to observe the joint or the like with a moving image for displaying it in real time using X-rays.

In addition, there is a case that a slice of a three-dimensional image captured of the joint or the like is reconstructed using a multi-planar reconstruction (MPR), and the MPR image is used to observe the joint or the like.

FIGS. 1A to 1E are diagrams illustrating examples of joint movements. For example, FIG. 1E illustrates the twisting movement of the wrist. A joint disorder is diagnosed by observing the movement of the bones and ligaments during such a joint movement. In the observation of the movement of the bones and ligaments, it is checked how a gap between a problematic bone and a bone adjacent thereto changes during the joint movement. Hereinafter, the bone may sometimes be referred to as "hard tissue".

The dynamics of the joint cannot be observed with a still image. Incidentally, "the dynamics of the joint" refers to the positional change of two hard tissues of the joint, which are moving relative to each other, and changes in a gap between the hard tissues.

The dynamics of the joint can be observed with a moving image. However, when the two hard tissues of the joint are moving relative to each other, the hard tissues appear overlapped depending on the viewing direction. In this case, the positional change of the two hard tissues and changes in a gap between them cannot be observed appropriately. Therefore, it is difficult to observe the dynamics of the joint.

Besides, when the dynamics of the joint is observed with an MPR image, even if one of the hard tissues is fixed, the other may sometimes disappear from the MPR image. Accordingly, it is difficult to observe the dynamics of the joint.

DETAILED DESCRIPTION

Figure 1A:
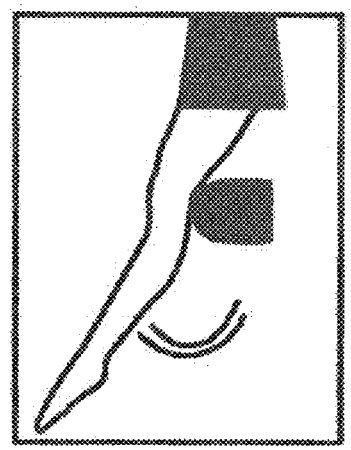
FIGS. 1A to 1E are diagrams illustrating examples of joint movements.
Figure 1B:
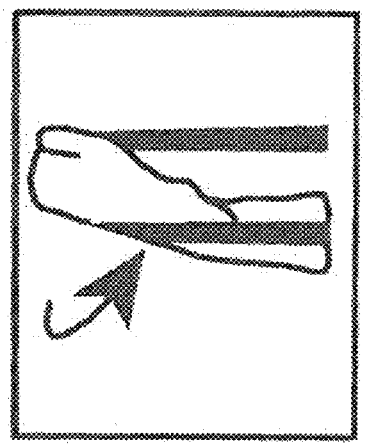
Figure 1C:
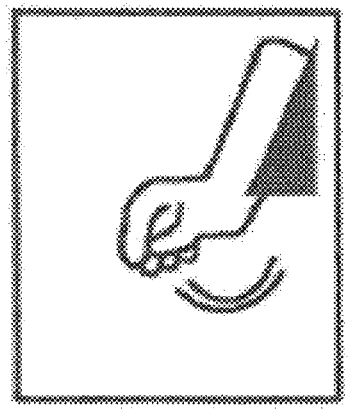
Figure 1D:
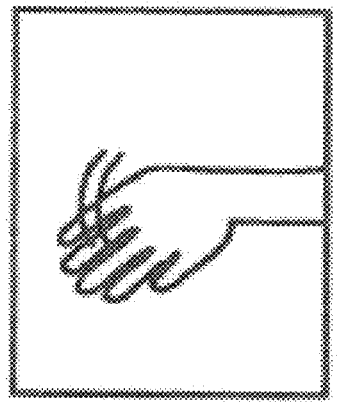
Figure 1E:
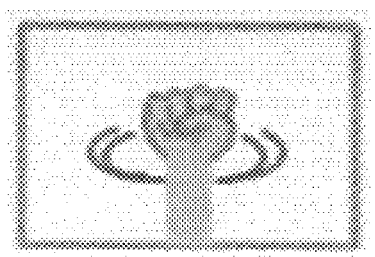

In general, according to one embodiment, a medical image processing apparatus is configured to capture images of an observation object over time to obtain a three-dimensional image. The observation object includes a first hard tissue and a second hard tissue which are adjacent to each other. The medical image processing apparatus includes a control circuit, a plane acquisition unit, and an image generator. Under the control of the control circuit, the plane acquisition unit extracts the first hard tissue and the second hard tissue based on the three-dimensional image. The image generator generates, as an image for observation, a cross-sectional image of a plane including the first hard tissue and at least part of the second hard tissue or an image projected on a plane parallel to the plane including the first hard tissue and at least part of the second hard tissue based on the three-dimensional image.

First, the outline of embodiments is described.

When a three-dimensional image is obtained by capturing images of a first hard tissue and a second hard tissue, which move relative to each other, over time, an image for observation (hereinafter, "observation image") is generated based on the three-dimensional image captured at a predetermined time. Incidentally, the three-dimensional image captured at a predetermined time may sometimes be referred to as "three-dimensional image at imaging time".

At this time, the observation image is generated as follows:

Obtain a direction in which two hard tissues projected on a plane do not overlap with each other in the plane; and generate an image of the hard tissues projected from the direction thus obtained as the observation image at imaging time. The observation image generated as above indicates a gap between the two hard tissues.

Note that the plane may be flat as well as curved. However, it is assumed herein that the plane is flat.

To be more specific, when the first hard tissue has an axial shape, obtain a flat plane which includes the axis of the first hard tissue and at least one point of the second hard tissue. This is because the flat plane passes through the gap between the two hard tissues. Next, generate an image of the two hard tissues cut out along the flat plane obtained, or an image of the two hard tissues projected on a plane parallel to the flat plane as the observation image at imaging time. The observation image generated as above indicates a gap between the two hard tissues.

In addition, when the second hard tissue also has an axial shape, the gap is generated between the two hard tissues along the axis of the second hard tissue as well as along the axis of the first hard tissue. It is sufficient to obtain a flat plane which includes, besides the axis of the first hard tissue, at least one point of the second hard tissue. Note that, if the one point is located in the center of the axis of the second hard tissue, the flat plane passes through more center of the gap as compared to the case where the one point is located at the end of the axis of second hard tissue. Thus, the center of the gap can be observed.

Besides, the first hard tissue and the second hard tissue move relative to each other, and the position of the gap between them changes along with the movement. This is a factor that poses a difficulty in observing the gap. For this reason, the position of the first hard tissue may be fixed in the observation image.

More details of the above description are given below.

<First Embodiment>

Figure 2:
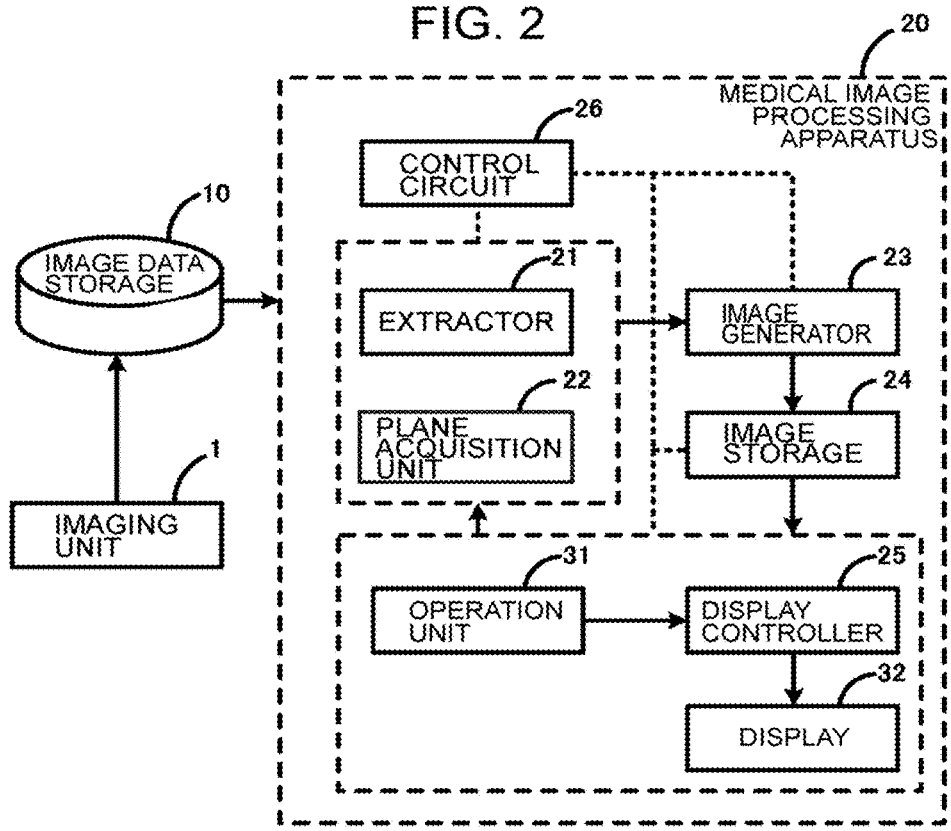
FIG. 2 is a block diagram illustrating a configuration of a medical image processing apparatus according to a first embodiment.
Figure 3:
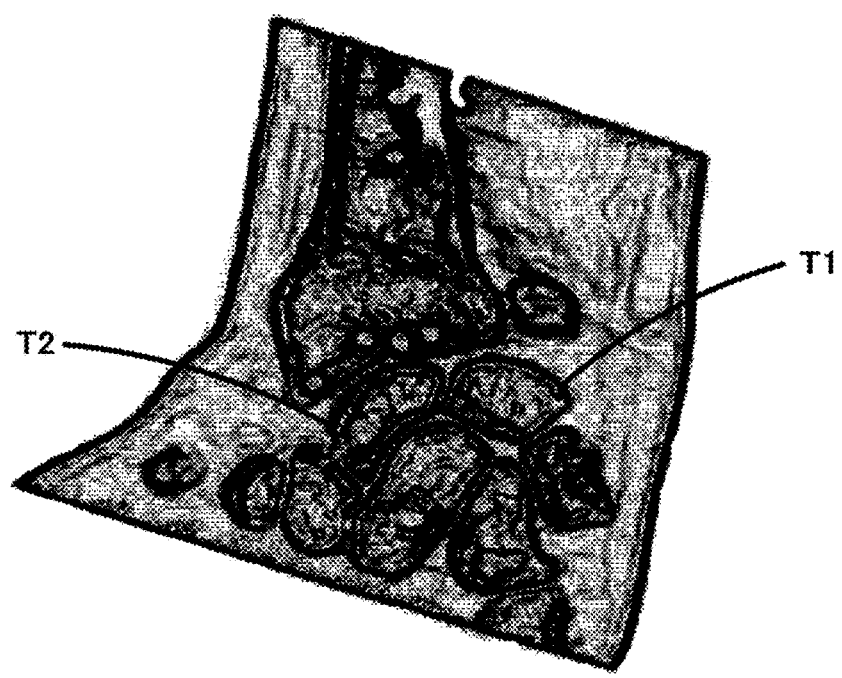
FIG. 3 is an example of a three-dimensional image captured.

With reference to FIGS. 2 to 5, a description is given of a medical image processing apparatus 20 according to a first embodiment. FIG. 2 is a block diagram illustrating a configuration of a medical image processing apparatus 20 of the first embodiment. FIG. 3 is an example of a three-dimensional image captured.

An imaging unit 1 captures images of an observation object over time to obtain a three-dimensional image. The three-dimensional image captured at each imaging time (see FIG. 3) is stored in an image data storage 10 as illustrated in FIG. 2.

As can be seen in FIG. 2, the medical image processing apparatus 20 includes an extractor 21, a plane acquisition unit 22, an image generator 23, an image storage 24, a display controller 25, a control circuit 26, an operation unit 31, and a display 32.

The extractor 21 extracts the axis of the first hard tissue and that of the second hard tissue based on the three-dimensional image captured. The plane acquisition unit 22 acquires a flat plane ABC including the axis of the first hard tissue and the center point on the axis of the second hard tissue. The image generator 23 generates an image of the two hard tissues projected on a plane (planes PP1 and PP2 illustrated in FIGS. 7A and 7B) parallel to the flat plane ABC as the observation image based on the three-dimensional image. The image storage 24 stores the observation image thus generated. The display controller 25 displays the observation image on the display 32. The operation unit 31 includes a keyboard and a mouse. The display 32 includes a monitor and a printer. The control circuit 26 controls the processes based on the functions of the medical image processing apparatus 20 and the processes performed by the units that constitute the medical image processing apparatus 20. The control circuit 26 controls each function and each unit of the medical image processing apparatus 20 according to a processing program, thereby implementing the operation of the medical image processing apparatus 20.

In FIG. 2, a dotted line indicates an electrical connection between the control circuit 26 and each unit. A solid arrow indicates a flow of information acquired or generated by each unit.

Figure 4:
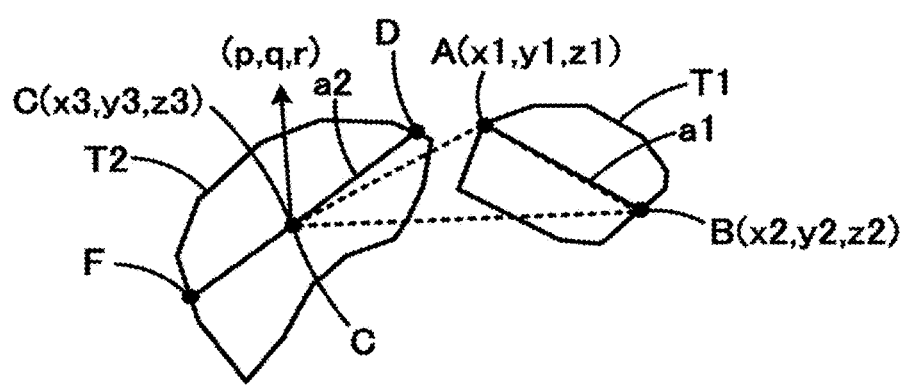
FIG. 4 is an explanatory diagram illustrating a plane including a first axis and a point on a second axis acquired by a control circuit.
Figure 5:
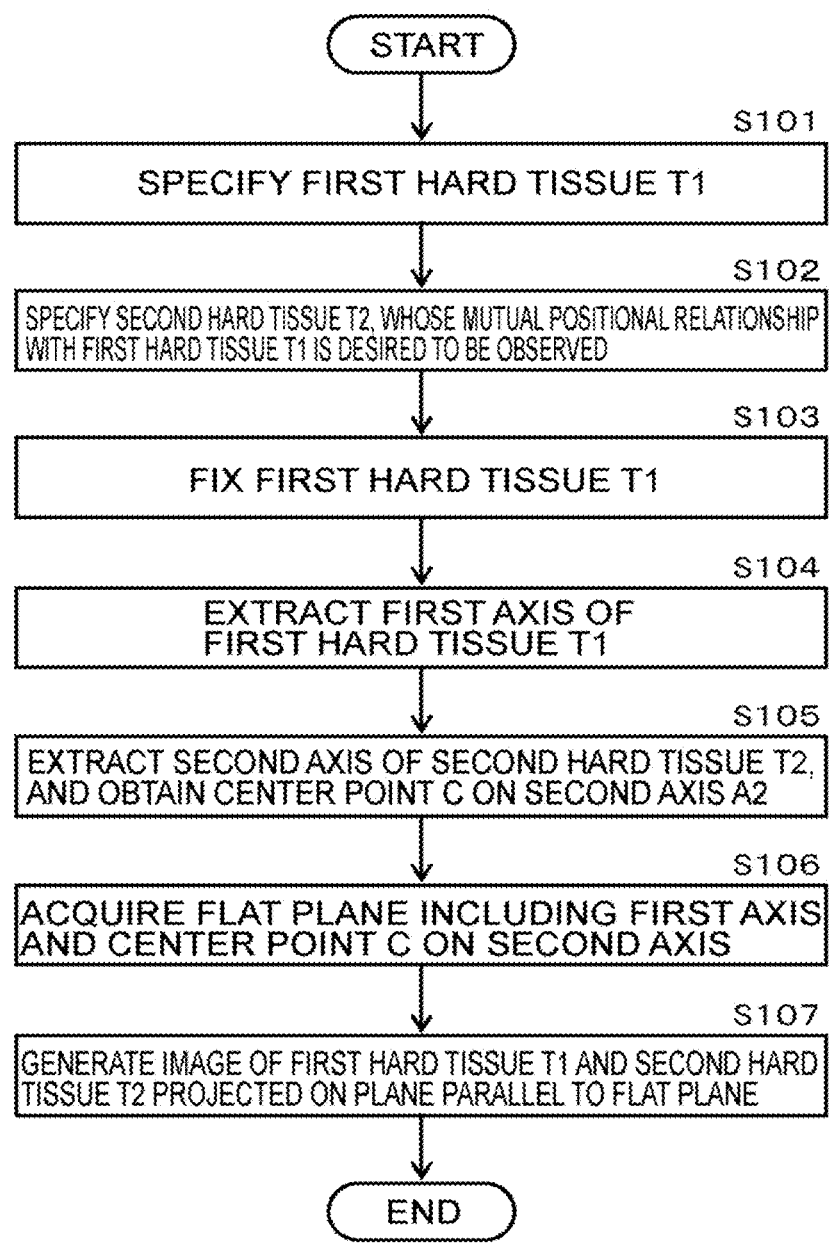
FIG. 5 is a flowchart illustrating a series of processes for generating an image for observation in the first embodiment.

Next, with reference to FIGS. 4 and 5, a description is given of a series of operations from specifying hard tissues until the generation of an observation image. FIG. 4 is an explanatory diagram illustrating a plane including points on a first axis and a second axis acquired by the control circuit 26. FIG. 5 is a flowchart illustrating a series of processes for generating an observation image.

Described below is how to specify a first hard tissue T1 and a second hard tissue T2.

The extractor 21 extracts a bone part as a hard tissue at each imaging time based on a three-dimensional image captured at the imaging time. Examples of information that represents the hard tissue thus extracted include the shape, position (including the orientation), and size of the hard tissue, a signal value (CT value, etc.), and the imaging time. Incidentally, the three-dimensional image captured at each imaging time may sometimes be referred to as "three-dimensional image at each imaging time".

In response to an instruction provided by the operator using the operation unit 31, the control circuit 26 specifies the first hard tissue T1 (a hard tissue fixed in the latter step) from among a plurality of hard tissues extracted (step S101 in FIG. 5). In addition, the control circuit 26 specifies the second hard tissue T2 that is adjacent to the first hard tissue T1 and moves around the first axis a1 relative to the first hard tissue T1 (step S102). The second hard tissue T2 is a hard tissue, whose mutual positional relationship with the first hard tissue T1 is desired to be observed. The control circuit 26 stores, in the image storage 24, information that indicates the first hard tissue T1 and the second hard tissue T2 at each imaging time.

Next, in response to an instruction provided by the operator using the operation unit 31, the control circuit 26 arranges the first hard tissue T1 in a fixed position to fix it thereto (step S103). Then, the control circuit 26 arranges the second hard tissue T2 in a relative position to the fixed position of the first hard tissue T1. In other words, the control circuit 26 fixes the first hard tissue T1, which moves at each imaging time, such that the first hard tissue T1 is always displayed in the same position. When a three-dimensional image including the first hard tissue T1 is moved or rotated (hereinafter, the process of moving and rotating the three-dimensional image and the process of moving or rotating the three-dimensional image are collectively referred to as "moving" the three-dimensional image), the first hard tissue T1 is displayed in the fixed position. In response to the movement of the three-dimensional image, the second hard tissue T2 is moved to the relative position at each imaging time.

The control circuit 26 stores, in the image storage 24, the fixed positing of the first hard tissue T1 and the position of the second hard tissue T2 that is moved at each imaging time as information that indicates the first hard tissue T1 and the second hard tissue T2 at each imaging time.

Disrobed below is the extraction of the first axis a1 of the first hard tissue T1. In response to an instruction provided by the operator using the operation unit 31, the control circuit 26 extracts the first axis a1 by using the extraction function. The control circuit 26 specifies both ends L and M in the axial direction (longitudinal direction) of the first hard tissue T1 (not illustrated in FIG. 4). Incidentally, the ends L and M are different from both ends A and B of the first axis a1 obtained later.

The control circuit 26 generates cross sections perpendicular to a straight line connecting the ends L and M at regular intervals along the straight line. Incidentally, the straight line connecting the ends L and M is different from the first axis a1 obtained later.

After that, the control circuit 26 obtains the center of gravity of each cross section. Subsequently, the control circuit 26 obtains a regression line by the method of least squares for the center of gravity. Upon setting the regression line as the first axis a1, the extraction of the first axis a1 of the first hard tissue T1 is completed (step S104 in FIG. 5).

Thereafter, the control circuit 26 extracts the second axis a2 of the second hard tissue T2, and obtains the coordinates of the center point C on the second axis a2 (step S105).

Specifically, first, the control circuit 26 extracts the second axis a2 of the second hard tissue T2. The second axis a2 is extracted in the same manner as described previously for the first axis a1. Therefore, the description is not provided here.

Next, the control circuit 26 obtains the coordinates (x3, y3, z3) of the center point C on the second axis a2 as a point at the same distance from both ends D and F of the second axis a2. Here, the coordinates of the center point C are obtained from among points on the second axis a2 to enable the flat plane ABC obtained in the latter step to pass through more center of the gap between the two hard tissues T1 and T2, thereby enabling the center of the gap to be observed as described above.

The control circuit 26 acquires the flat plane ABC including the first axis a1 of the first hard tissue T1 and the center point C on the second axis a2 of the second hard tissue T2 by using the plane acquisition function (step S106).

Specifically, the control circuit 26 acquires the flat plane ABC in the following manner. FIG. 4 indicates the flat plane ABC to be obtained as a triangle enclosed by a broken line with the center C and the ends A and B of the first axis a1 as the apices.

The control circuit 26 obtains the coordinates (x1, y1, z1) of one end A of the first axis a1 and the coordinates (x2, y2, z2) of the other end B of the first axis a1.

The control circuit 26 then obtains vectors (p, q, r) perpendicular to vectors CA (x1-x3, y1-y3, z1-z3) as well as vectors CB (x2-x3, y2-y3, z2-z3).

Since the vectors (p, q, r) are normal vectors perpendicular to the flat plane ABC, the coordinates xyz in the flat plane ABC are represented by the following equation (1):

$$p(x-x_3)+q(y-y_3)+r(z-z_3)=0 \quad (1)$$

Figure 6:
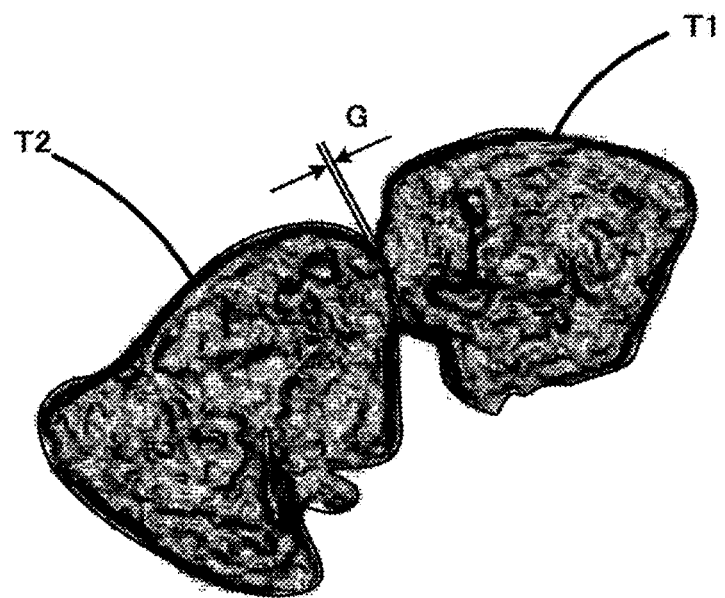
FIG. 6 is a view of an image of a first hard tissue and a second hard tissue projected on a plane parallel to the plane.

FIG. 6 is a view of an image of the first hard tissue T1 and the second hard tissue T2 projected on a plane parallel to the flat plane ABC.

Under the control of the control circuit 26, the image generator 23 retrieves the information that indicates the first hard tissue T1 and the second hard tissue T2 at each imaging time from the image storage 24. The image generator 23 generates an image of the first hard tissue T1 and the second hard tissue T2 projected on a plane parallel to the flat plane ABC as the observation image at each imaging time (step S107, see FIG. 6). The control circuit 26 stores the observation image thus generated in the image storage 24. Incidentally, the image generator 23 may generate an MPR image of the first hard tissue T1 and the second hard tissue T2 cut out along the flat plane ABC as the observation image at each imaging time.

The control circuit 26 performs the steps of FIG. 5 as described above on the three-dimensional image at each imaging time.

In the following, with reference to FIGS. 7A and 7B, a description is given of the reason why the observation image is generated at each imaging time.

Figure 7A:
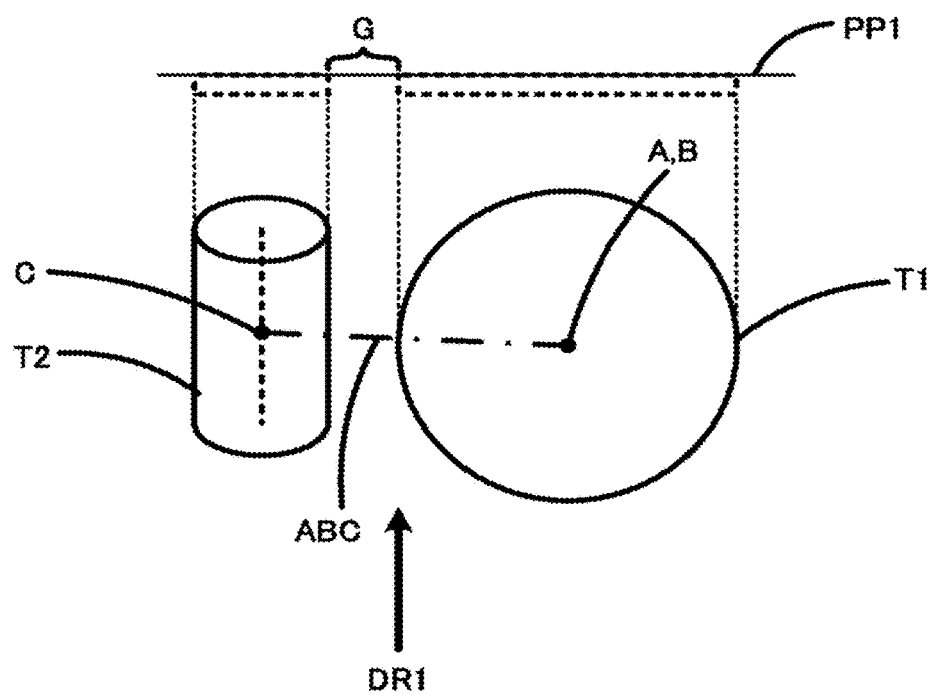
FIG. 7A is a schematic diagram of the first hard tissue and the second hard tissue projected on the plane parallel to the plane at first imaging time.
Figure 7B:
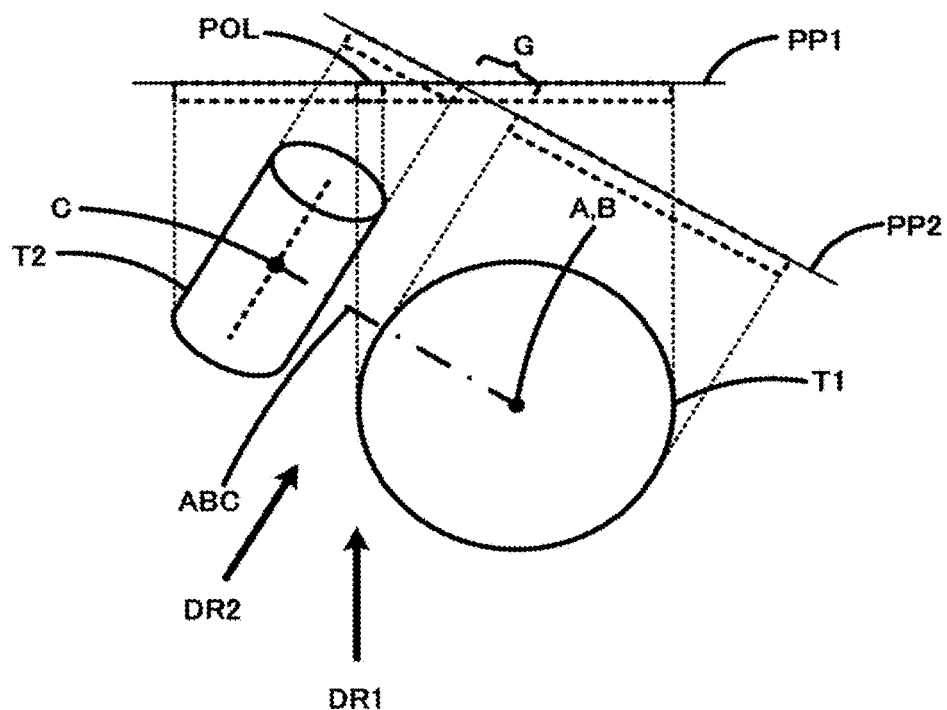
FIG. 7B is a schematic diagram of the first hard tissue and the second hard tissue projected on the plane parallel to the plane at second imaging time.

FIG. 7A is a schematic diagram of the first hard tissue T1 and the second hard tissue T2 projected on the plane PP1 parallel to the flat plane ABC at the first imaging time.

As described above, under the control of the control circuit 26, the image generator 23 projects the first hard tissue T1 and the second hard tissue T2 photographed at the first imaging time on the plane PP1 parallel to the flat plane ABC from a direction DR1 perpendicular to the flat plane ABC to generate an observation image. As illustrated in FIG. 7A, the image indicates a gap G between the first hard tissue T1 and the second hard tissue T2 projected on the plane PP1 parallel to the flat plane ABC.

Next, under the control of the control circuit 26, the image generator 23 projects the first hard tissue T1 and the second hard tissue T2 photographed at the second imaging time on the plane PP2 parallel to the flat plane ABC from a direction DR2 perpendicular to the flat plane ABC to generate an observation image. As illustrated in FIG. 7B, the image indicates the gap G between the first hard tissue T1 and the second hard tissue T2 projected on the plane PP2 parallel to the flat plane ABC.

If the flat plane ABC has not been changed from the first imaging time, the first hard tissue T1 and the second hard tissue T2 are projected on the plane PP1 from the direction DR1. The first hard tissue T1 and the second hard tissue T2 projected on the plane PP1 overlap with each other (see overlap portion POL in FIG. 7B), and the gap G is not indicated between them. That is, the gap G that is supposed to be observable cannot be observed unless the flat plane ABC is generated at each imaging time. This is the reason to generate the observation image at each imaging time.

When the observation image is generated, under the control of the control circuit 26, the display controller 25 displays the observation image at each imaging time on the display 32. The observation image indicates a gap between the hard tissues, which changes at every imaging time.

As described above, according to the first embodiment, the observation image is generated so as to display a gap between the first hard tissue and the second hard tissue. Thus, the dynamics of the joint can be observed easily with precision.

<Second Embodiment>

Figure 8:
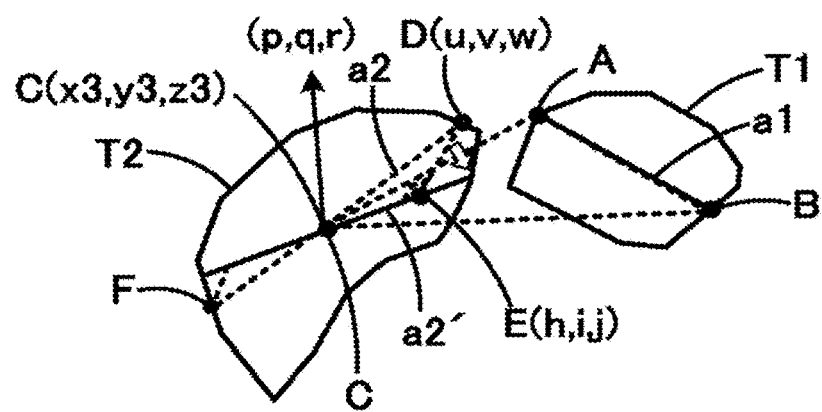
FIG. 8 is an explanatory diagram illustrating the second hard tissue rotated such that the second axis is placed on the plane according to a second embodiment.
Figure 9:
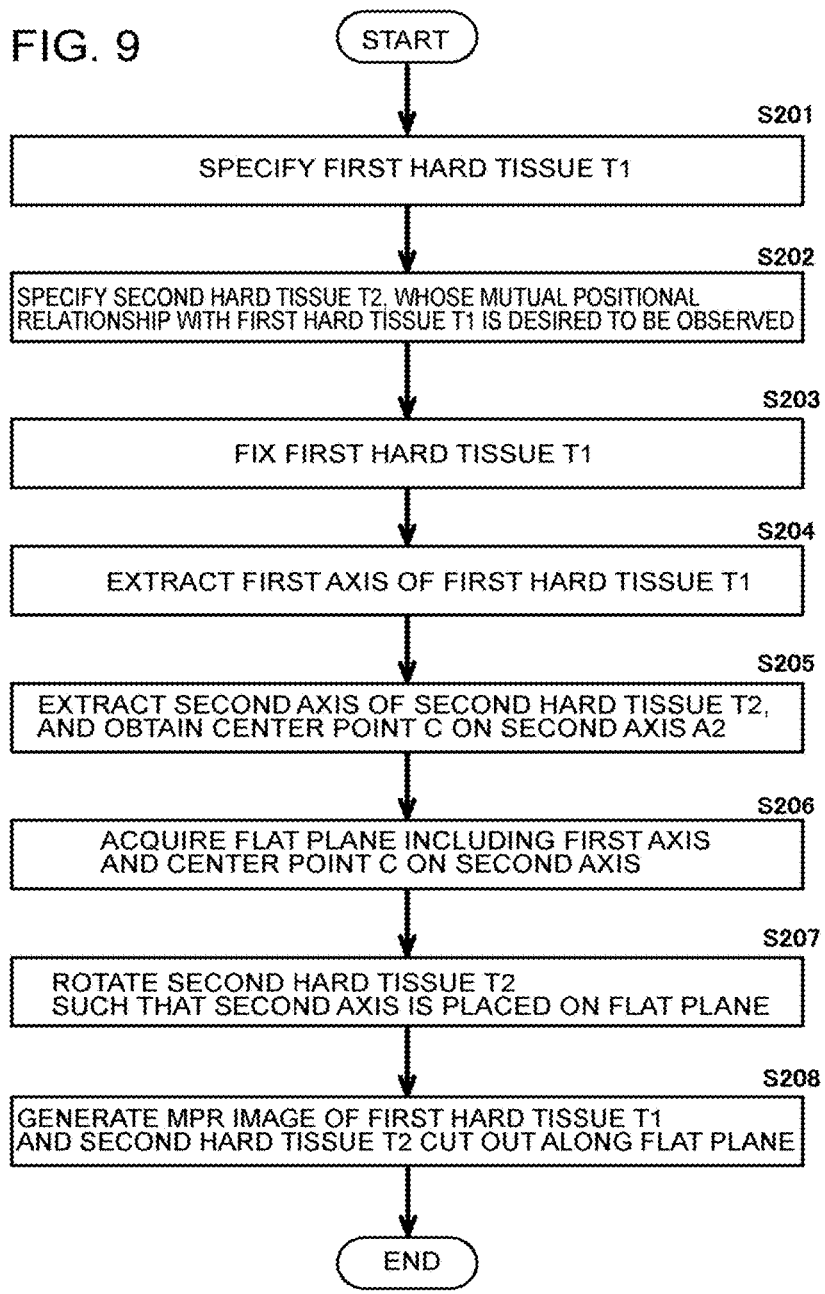
FIG. 9 is a flowchart illustrating a series of processes for generating an image for observation in the second embodiment.

With reference to FIGS. 2, 8 and 9, a description is given of a medical image processing apparatus according to a second embodiment. In the following, differences from the first embodiment are mainly described, and the same description is not repeated.

In the first embodiment, under the control of the control circuit 26, the plane acquisition unit 22 acquires the flat plane ABC including the first axis a1 and the center point C on the second axis a2. Then, the image generator 23 generates an image of the first hard tissue T1 and the second hard tissue T2 projected on a plane parallel to the flat plane ABC as the observation image.

However, the second axis a2 may sometimes be highly inclined with respect to the flat plane ABC and the plane parallel to the flat plane ABC. In this case, in the observation image, the shape of the second axis a2 projected on a plane parallel to the flat plane ABC or the shape of the second axis a2 cut out along the flat plane ABC is deformed from its original shape. Accordingly, the second hard tissue T2 at each imaging time is not displayed properly. As a result, changes in a gap between the two hard tissues may not be observed appropriately.

In view of the above, in the second embodiment, under the control of the control circuit 26, the plane acquisition unit 22 obtains the inclination θ of the second axis a2 with respect to the flat plane ABC. The image generator 23 rotates the second hard tissue T2 based on the inclination θ such that the second axis a2 is placed on the flat plane ABC. Thereby, the image generator 23 generates the observation image by projecting the second hard tissue T2 thus rotated as well as the first hard tissue T1 on a plane parallel to the flat plane ABC.

FIG. 8 is an explanatory diagram illustrating the second hard tissue rotated such that the second axis is placed on the plane according to the second embodiment. FIG. 9 is a flowchart illustrating a series of processes for generating an observation image. Incidentally, steps S201 to S206 in FIG. 9 are the same as steps S101 to S106 in FIG. 5.

In the second embodiment, the image generator 23 rotates the second hard tissue T2 such that the second axis a2 is placed on the flat plane ABC under the control of the control circuit 26 (step S207 in FIG. 9).

First, the plane acquisition unit 22 obtains the inclination θ of the second axis a2 with respect to the flat plane ABC under the control of the control circuit 26. Specifically, under the control of the control circuit 26, the plane acquisition unit 22 obtains a vector CD (u, v, w) directed from the center point C of the second hard tissue T2 toward one end D of the second axis a2. Then, under the control of the control circuit 26, the plane acquisition unit 22 obtains a straight line extending from the end D to cross the flat plane ABC at right angles and the coordinates of the intersection E. Thereafter, the plane acquisition unit 22 obtains a vector CE (h, i, j). Thus, the control circuit 26 obtains the inclination θ of the second axis a2 with respect to the flat plane ABC based on the vector CD (u, v, w) and the vector CE (h, i, j) through the plane acquisition unit 22.

The inclination θ (cos θ) is obtained by dividing the inner product of the vectors CD and CE by the sizes of the vectors, and is represented by the following equation (2):

$$\cos\theta = \frac{|\overrightarrow{CD}\cdot\overrightarrow{CE}|}{|\overrightarrow{CD}||\overrightarrow{CE}|} \quad (2)$$

Further, under the control of the control circuit 26, the image generator 23 rotates the second axis a2 around the center point C based on the inclination θ such that the second axis a2 is placed on the flat plane ABC (see FIG. 8). Here, the term "placed on" means that the second axis a2 rotated based on the inclination θ is parallel to the flat plane ABC as if placed thereon. The control circuit 26 stores information on the second hard tissue T2 rotated as above in the image storage 24. FIG. 8 illustrates the second axis a2' placed on the flat plane ABC.

Under the control of the control circuit 26, the image generator 23 retrieves information on the first hard tissue T1 and the second hard tissue T2 at each imaging time from the image storage 24. The image generator 23 then generates an MPR image of the first hard tissue T1 and the second hard tissue T2 cut out along the flat plane ABC as the observation image at each imaging time (step S208 in FIG. 9).

As described above, according to the second embodiment, the observation image is generated so as to display a gap between the first hard tissue and the second hard tissue. Thus, the dynamics of the joint can be observed easily with precision.

Particularly, in the second embodiment, the inclination of the second axis is obtained, and the second axis is rotated based on the inclination so as to be placed on the flat plane ABC. This enables the second hard tissue to be presented almost in its original shape on the flat plane ABC. Thus, the second hard tissue T2 is displayed properly at each imaging time. As a result, changes in a gap between the two hard tissues can be observed easily with precision.

Incidentally, as in the first embodiment, the control circuit 26 may generate an image of the first hard tissue T1 and the second hard tissue T2 projected on a plane parallel to the flat plane ABC as the observation image at each imaging time.

<Third Embodiment>

With reference to FIGS. 2 and 10 to 13, a description is given of a medical image processing apparatus according to a third embodiment. In the following, differences from the second embodiment are mainly described, and the same description is not repeated.

In the second embodiment, under the control of the control circuit 26, the plane acquisition unit 22 obtains the inclination θ of the second axis a2 with respect to the flat plane ABC. The image generator 23 rotates the second axis a2 around the center point C based on the inclination θ such that the second axis a2 is placed on the flat plane ABC. Thereafter, the image generator 23 generates an MPR image cutting out a slice of the second hard tissue T2 thus rotated along the flat plane ABC.

In the third embodiment, under the control of the control circuit 26, the plane acquisition unit 22 acquires a second flat plane ABC' including the first axis a1 and the second axis a2' placed on the flat plane ABC. Then, the image generator 23 generates an image of the first hard tissue T1 and the second hard tissue T2 rotated about the center point C, which are projected on a plane parallel to the second flat plane ABC'.

Figure 10:
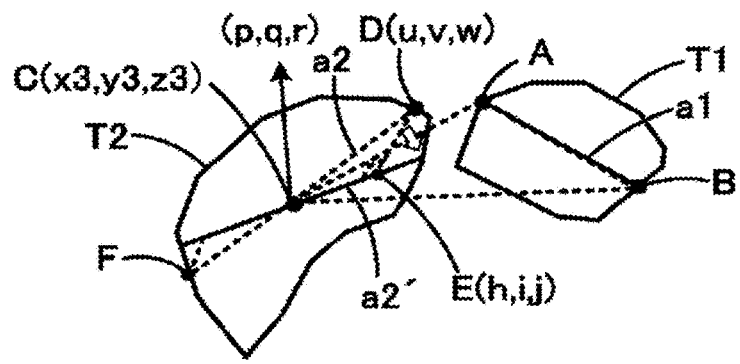
FIG. 10 is an explanatory diagram illustrating the second hard tissue before being rotated by the control circuit such that the second axis is placed on the plane according to a third embodiment.
Figure 11:
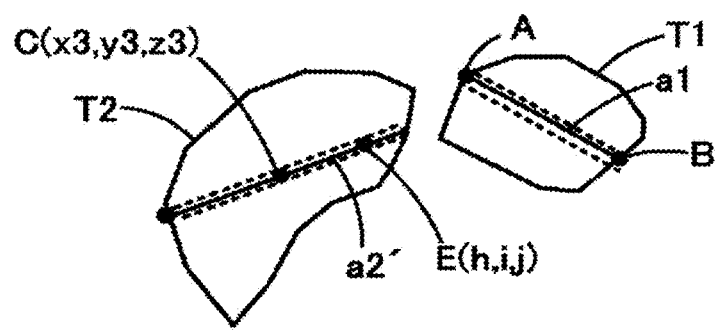
FIG. 11 is an explanatory diagram illustrating the second hard tissue having been rotated by the control circuit such that the second axis is placed on the plane in the third embodiment.
Figure 12:
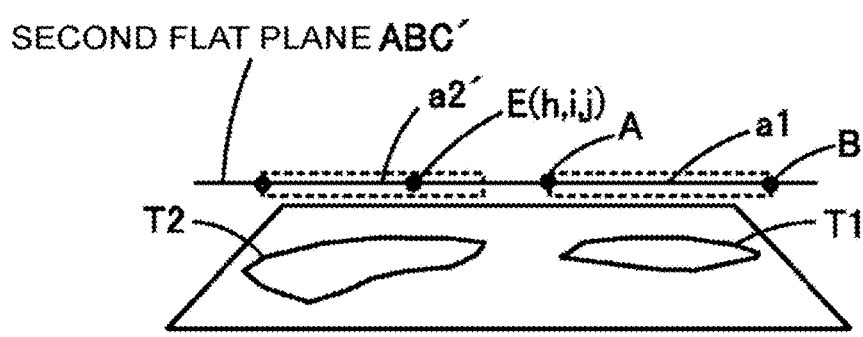
FIG. 12 is a schematic diagram of the first hard tissue and the second hard tissue projected on the plane parallel to the plane.
Figure 13:
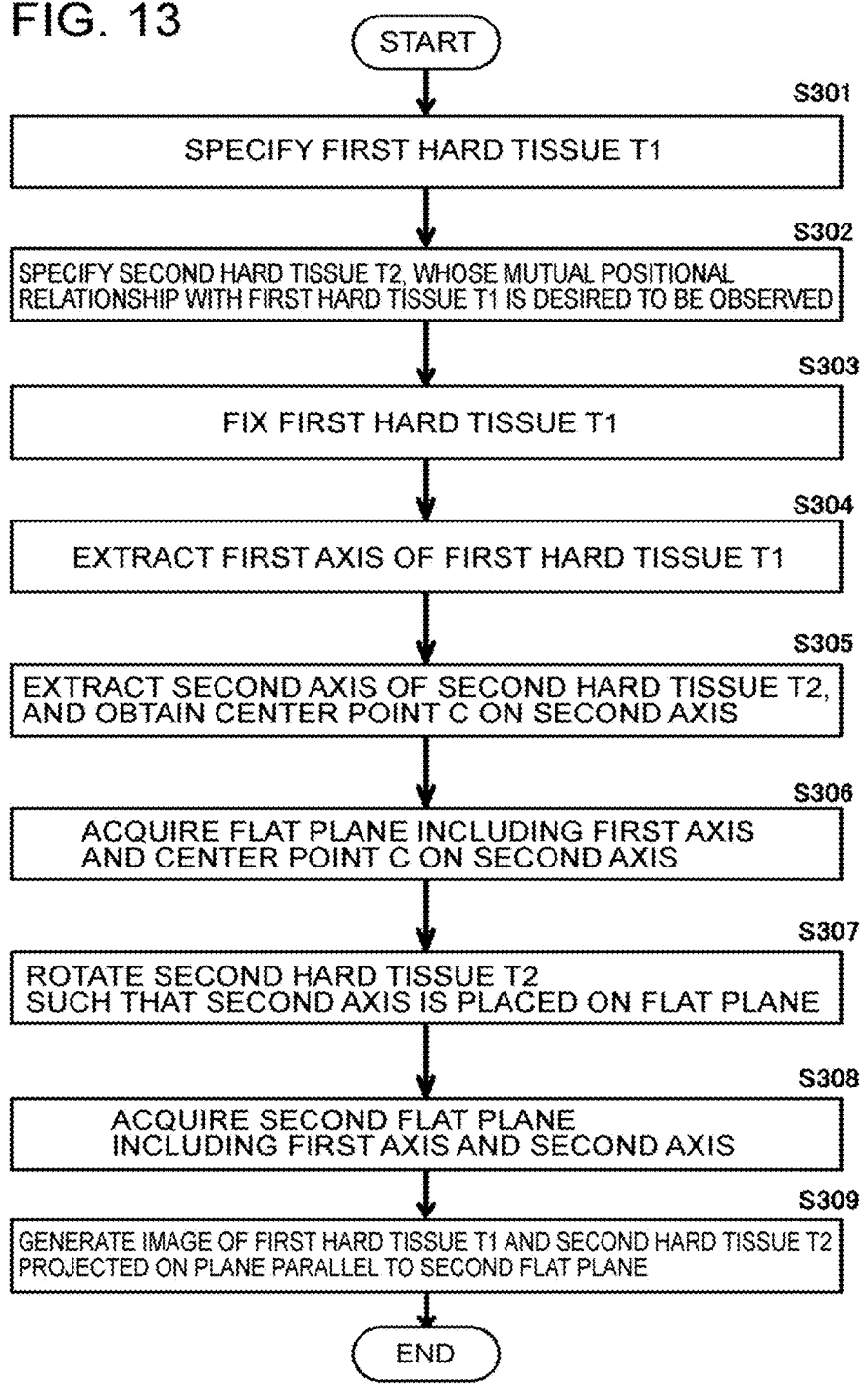
FIG. 13 is a flowchart illustrating a series of processes for generating an image for observation in the third embodiment.

FIG. 10 is an explanatory diagram illustrating the second hard tissue T2 before the control circuit 26 rotates the second axis a2 so that it is placed on the flat plane ABC in the third embodiment. FIG. 11 is an explanatory diagram illustrating the second hard tissue T2 after the control circuit 26 rotates the second axis a2 so that it is placed on the flat plane ABC. FIG. 12 is a schematic diagram of the first hard tissue T1 and the second hard tissue T2 projected on a plane parallel to the flat plane ABC. FIG. 13 is a flowchart illustrating a series of processes for generating an observation image. Incidentally, steps S301 to S306 in FIG. 13 are the same as steps S101 to S106 in FIG. 5.

In the third embodiment, as illustrated in FIGS. 10 to 12, under the control of the control circuit 26, the plane acquisition unit 22 rotates the second axis a2 around the center point C based on the inclination θ such that the second axis a2 is placed on the flat plane ABC (step S307 in FIG. 13). FIG. 10 illustrates the second axis a2' placed on the flat plane ABC. Further, the plane acquisition unit 22 acquires the second flat plane ABC' including the first axis a1 and the second axis a2' thus rotated (step S308).

Under the control of the control circuit 26, the image generator 23 retrieves information that indicates the first hard tissue T1 and the second hard tissue T2 at each imaging time from the image storage 24. The image generator 23 generates an image of the first hard tissue T1 and the second hard tissue T2 projected on a plane parallel to the second flat plane ABC' as the observation image at each imaging time (step S309).

Incidentally, the image generator 23 may generate an MPR image of the first hard tissue T1 and the second hard tissue T2 cut out along the second flat plane ABC' as the observation image at each imaging time.

Although the center point C on the second axis a2 of the second hard tissue T2 is described in the above embodiments as a point included in the flat plane ABC, this is by way of example and not limitation. The point may be any point on the second axis a2. When the point is at the end D of the second axis a2, the image generator 23 rotates the second hard tissue T2 about the end D such that the second axis a2 is placed on the flat plane ABC.

In addition, although the observation of a gap between the two hard tissues T1 and T2 is described in the above embodiments, this is by way of example and not limitation. This configuration for observing the joint and the like can be applied to the observation of gaps of three or more hard tissues.

Further, as an image for observing gaps of three or more hard tissues, an MPR image and/or a curved multiplanar reconstruction (CPR) image may be generated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical image processing apparatus configured to capture images of an observation object over time to obtain a three-dimensional image, the observation object including a first hard tissue and a second hard tissue adjacent to each other, the apparatus comprising:
    a control circuit configured to
        extract the first hard tissue and the second hard tissue based on the three-dimensional image; and
        generate, as an image for observation, a cross-sectional image of a reference plane including the first hard tissue and at least part of the second hard tissue or an image projected on a parallel plane parallel to the reference plane including the first hard tissue and at least the part of the second hard tissue based on the three-dimensional image, wherein the control circuit is further configured to
    generate the image for observation so that the reference plane includes a first axis of the first hard tissue,
    extract a second axis of the second hard tissue,
    generate the image for observation so that the reference plane includes at least a point on the second axis as the part of the second hard tissue,
    rotate the second hard tissue about the point such that the second axis is placed on the reference plane, and
    generate a cross-sectional image as the image for observation by cutting out the first hard tissue and the rotated second hard tissue along the reference plane.

2. A medical image processing apparatus configured to capture images of an observation object over time to obtain a three-dimensional image, the observation object including a first hard tissue and a second hard tissue adjacent to each other, the apparatus comprising:
    a control circuit configured to
        extract the first hard tissue and the second hard tissue based on the three-dimensional image; and
        generate, as an image for observation, a cross-sectional image of a reference plane including the first hard tissue and at least part of the second hard tissue or an image projected on a parallel plane parallel to the reference plane including the first hard tissue and at least the part of the second hard tissue based on the three-dimensional image, wherein the control circuit is further configured to
    generate the image for observation so that the reference plane includes a first axis of the first hard tissue,
    extract a second axis of the second hard tissue,
    generate the image for observation so that the reference plane includes at least a point on the second axis as the part of the second hard tissue,
    rotate the second hard tissue about the point such that the second axis is placed on the reference plane as a first plane,
    acquire a second plane including the first axis and the second axis placed on the first plane, and
    project the first hard tissue and the second hard tissue rotated onto a plane parallel to the second plane to obtain the image projected on the parallel plane as the image for observation.

3. The medical image processing apparatus of claim 1, wherein the point is a center point on the second axis.

4. The medical image processing apparatus of claim 2, wherein the point is a center point on the second axis.

5. The medical image processing apparatus of claim 1, wherein the control circuit is further configured to
    fix the first hard tissue to a fixed position determined in advance in the image for observation upon generating the image for observation, and
    arrange the second hard tissue in a position relative to the fixed position of the first hard tissue.

6. The medical image processing apparatus of claim 2, wherein the control circuit is further configured to
    fix the first hard tissue to a fixed position determined in advance in the image for observation upon generating the image for observation, and
    arrange the second hard tissue in a position relative to the fixed position of the first hard tissue.

7. The medical image processing apparatus of claim 1, wherein the control circuit is further configured to generate the image for observation each time a three-dimensional image is obtained.

8. The medical image processing apparatus of claim 2, wherein the control circuit is further configured to generate the image for observation each time a three-dimensional image is obtained.

9. The medical image processing apparatus of claim 1, wherein the control circuit is further configured to
    extract the first axis, the second axis, and the cross-sectional image from the three-dimensional image, and
    determine the first axis as a regression line for a plurality of center of gravity points of cross sections of the first hard tissue.

10. The medical image processing apparatus of claim 2, wherein the control circuit is further configured to
    extract the first axis, the second axis, and the cross-sectional image from the three-dimensional image, and
    determine the first axis as a regression line for a plurality of center of gravity points of cross sections of the first hard tissue.

* * * * *